(12) United States Patent  
Choi

(10) Patent No.: US 7,817,902 B2
(45) Date of Patent: Oct. 19, 2010

(54) APPARATUS AND METHOD OF GENERATING VIDEO-REPRODUCING CLOCK SIGNAL FROM 480P SIGNAL

(75) Inventor: Yoon-seop Choi, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 2063 days.

(21) Appl. No.: 10/743,903

(22) Filed: Dec. 24, 2003

(65) Prior Publication Data

US 2004/0136691 A1 Jul. 15, 2004

(30) Foreign Application Priority Data

Dec. 26, 2002 (KR) .................. 10-2002-0084078

(51) Int. Cl.
*H04N 5/91* (2006.01)
(52) U.S. Cl. .................. 386/94; 386/69; 360/60; 380/201; 380/202; 380/203; 380/204; 380/205; 380/206; 380/207; 380/208; 380/209; 705/57; 369/53.21; 369/47.12; 369/30.05
(58) Field of Classification Search .................. 386/94, 386/69, 95; 348/536, 540, 547, 548; 360/60; 380/201–209; 369/53.21, 47.12, 30.05
See application file for complete search history.

(56) References Cited

U.S. PATENT DOCUMENTS 5,469,220 A * 11/1995 Kumada .................. 348/529
5,502,711 A * 3/1996 Clark et al. .................. 369/59.17
5,621,475 A * 4/1997 Irie .................. 348/607
5,892,745 A * 4/1999 Belser .................. 369/53.33
6,768,385 B2 * 7/2004 Smith .................. 331/1 A
7,015,973 B2 * 3/2006 Kim .................. 348/536
2002/0167365 A1 * 11/2002 Smith .................. 331/100
2004/0047252 A1 * 3/2004 Miyatake et al. .................. 369/47.12

FOREIGN PATENT DOCUMENTS

WO WO 0239434 A1 * 5/2002

* cited by examiner

*Primary Examiner*—Thai Tran
*Assistant Examiner*—Helen Shibru
(74) *Attorney, Agent, or Firm*—Staas & Halsey LLP

(57) ABSTRACT

An apparatus and a method of generating a video-reproducing clock signal from a 480p signal. The apparatus generates a video-reproducing clock signal from a 480p signal that includes a vertical synchronization signal, horizontal synchronization signals, and copy guard signals. The apparatus includes a coast signal generating unit and a clock signal generating unit. The coast signal generating unit generates a plurality of coast signals with pulse widths, each of which covers the different number of copy guard signals on the basis of the present copy guard signal in one frame signal of the 480p signal. The clock signal generating unit generates horizontal synchronization signals at the same period as that of the horizontal synchronization signals generated in a previous frame, while the corresponding coast signal is being generated.

10 Claims, 3 Drawing Sheets

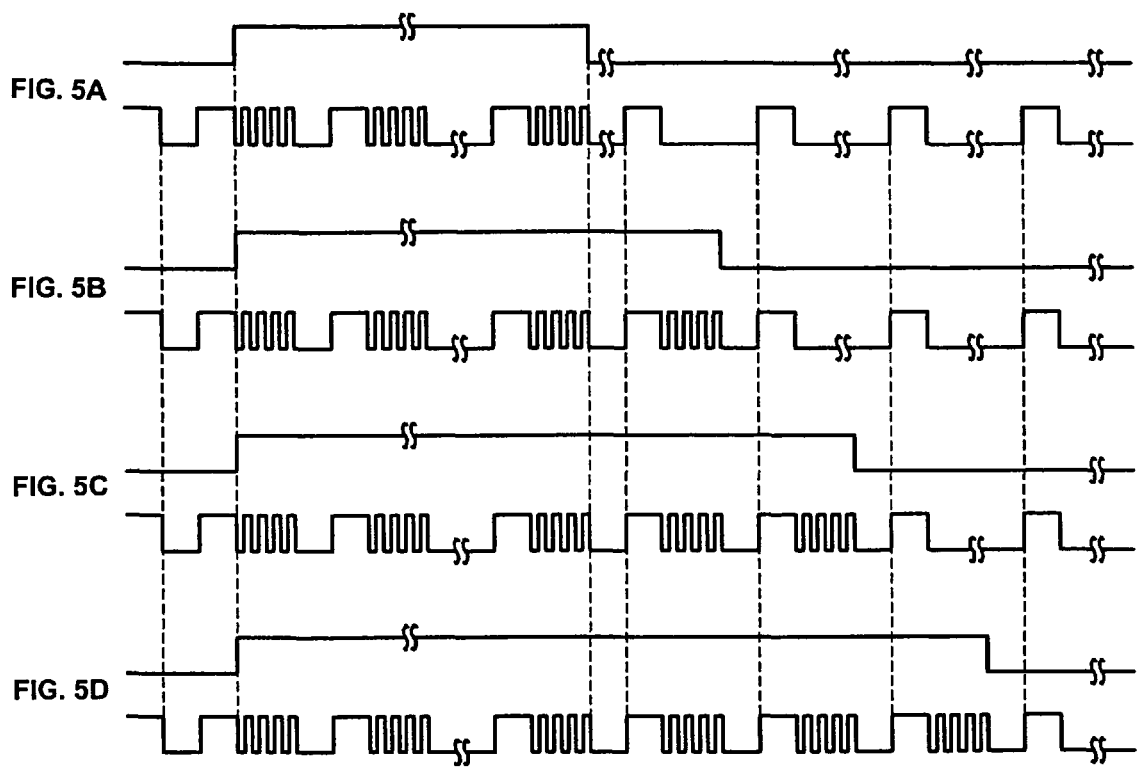

US 7,817,902 B2

APPARATUS AND METHOD OF GENERATING VIDEO-REPRODUCING CLOCK SIGNAL FROM 480P SIGNAL

CROSS-REFERENCE TO RELATED APPLICATIONS

This application claims priority from Korean Patent Application No. 2002-84078, which was filed on Dec. 26, 2002, in the Korean Intellectual Property Office, the disclosure of which is incorporated herein in its entirety by reference.

BACKGROUND OF THE INVENTION

1. Field of the Invention

The present invention relates to an apparatus and a method for generating a phase-locked signal by extracting a copy guard signal from a display signal, and, more particularly, to an apparatus and a method of generating a video-reproducing clock signal from a 480p signal, in which a coast signal is generated in accordance with a change in the format of the copy guard signal.

2. Description of the Related Art

Video signals can be transmitted, received, processed, and displayed in the format of progressive scanning or interlaced scanning. In progressive scanning, also referred to as non-interlaced scanning, video images are displayed as a consecutive frame. All horizontal lines in each frame are displayed in consecutive order. In a standard image format, i.e., a 480p format, all 480 horizontal lines (in sequence from 1-480) in a frame are displayed in consecutive order.

FIG. 1 illustrates a typical 480p-format composite video signal. The 480p-format composite video signal of FIG. 1 includes a vertical synchronization signal (V_sync) 101, horizontal synchronization signals (H_sync) 102, and copy guard signals 103. The vertical synchronization signal 101 is generated at the beginning of frame 100. The horizontal synchronization signals 102 are generated when a new horizontal line starts. The copy guard signals 103 are intended to prevent copying of video signals in question. The copy guard signal 103 is inserted between two respective horizontal synchronization signals 102 in a 4×9 format (which is, 4 pulsed signals for each of 9 horizontal synchronization signals) just after the vertical synchronization signal 101 has been generated.

A scaler, which converts the format of RGB video signals to match the resolution of a display in question, and an analog-to-digital converter (ADC), which converts an analog signal to a digital signal, operate in response to a phase-locked clock signal generated by using the horizontal synchronization signals 102. In a conventional approach for extracting only the horizontal synchronization signals 102 from the 480p-format composite video signal of FIG. 1, a window signal, called a coast signal, is generated in a component of the ADC or scaler to cover an area, which includes the copy guard signals 103. While the coast signal is being generated instead of the original horizontal synchronization signals 102, artificial horizontal synchronization signals are generated with a regular period and input to the phase-locked loop (PLL). In this way, it is possible to prevent the occurrence of undesired clock signals due to the copy guard signals 103.

However, if the format of the original video signal changes and the format of the copy guard signal 103 changes, it is impossible to generate an adaptive clock signal in accordance with the changes, because the coast signal may have a fixed length for 4×9 format of copy guard signals 103.

SUMMARY OF THE INVENTION

Accordingly, it is an aspect of the present invention to provide an apparatus and a method for generating a clock signal in accordance with a change in the format of a copy guard signal, thereby preventing the generation of distorted clock signals and further screen distortion due to changes of the copy guard signals.

Additional aspects and/or advantages of the present invention will be set forth in part in the description that follows, and, in part, will be obvious from the description, or may be learned by practicing the present invention.

The foregoing and/or other aspects of the present invention are achieved by providing an apparatus that generates a video-reproducing clock signal from a 480p signal that includes a vertical synchronization signal, horizontal synchronization signals, and copy guard signals. The apparatus comprises a coast signal generating unit and a clock signal generating unit. The coast signal generating unit generates a plurality of coast signals with pulse widths, each of which covers the different number of copy guard signals on the basis of the present copy guard signal in one frame signal of the 480p signal. The clock signal generating unit generates horizontal synchronization signals at the same period as that of the horizontal synchronization signals generated in a previous frame, while the corresponding coast signal is being on.

The coast signal generating unit comprises a counter and a coast signal generating unit. The counter counts falling edges of signals in the present frame signal of the 480p signal. The coast signal generating unit generates n coast signals with n different pulse widths on the basis of the counted falling edges of signals.

The coast signal generating unit generate a first coast signal with a pulse width that covers the number of falling edges and is less than 525, second coast signal with a pulse width that covers the number of falling edges that ranges from 526 to 535, a third coast signal with a pulse width that covers the number of falling edges that ranges from 536 to 545, and a fourth coast signal with a pulse width that covers the number of falling edges that ranges from 546 to 558.

The clock signal generating unit generates a phase-locked clock signal using horizontal synchronization signals, included in the 480p signal, while the coast signal is off.

The foregoing and/or other aspects of the present invention may also be achieved by providing an apparatus that generates a video-reproducing clock signal from a 480p signal that includes a vertical synchronization signal, horizontal synchronization signals, and copy guard signals. The apparatus comprises a storing unit, a counter, a coast signal generating unit, and a clock signal generating unit. The storing unit stores information of the period of the horizontal synchronization signals generated in a previous frame. The counter counts falling edges of signals generated after the vertical synchronization signal included in the 480p signal. The coast signal generating unit generates n coast signals with n different pulse widths on the basis of the count values of the counter. The clock signal generating unit generates horizontal synchronization signals with the period according to the information stored in the storing unit and generates a clock signal using the generated horizontal synchronization signals, while the coast signal is being on, and generates a clock signal using horizontal synchronization signals included in the 480p signal while the coast signal is not on.

The coast signal generating unit generates a signal with a reference pulse width that corresponds to a reference count value and generates signals with pulse widths, each of which is extended by a predetermined value that the reference pulse width.

The coast signal generating unit generates a first coast signal with a pulse width that covers the number of falling edges and is less than 525, a second coast signal with a pulse width that covers the number of falling edges that ranges from 526 to 535, a third coast signal with a pulse width that covers the number of falling edges that ranges from 536 to 545, and a fourth coast signal with a pulse width that covers the number of falling edges that ranges from 546 to 558.

The above and/or other aspects of the present invention may also be achieved by providing a method of generating a video-reproducing clock signal from a 480p signal that includes a vertical synchronization signal, horizontal synchronization signals, and copy guard signals. The method comprises counting falling edges of signals generated after the vertical synchronization signal included in the 480p signal, generating a plurality of coast signals on the basis of the counted number of falling edges of a counter, and while a corresponding coast signal is being on, generating horizontal synchronization signals with a predetermined period and generating a clock signal using the generated horizontal synchronization signals, and, while the coast signal is not on, generating a clock signal using the present horizontal synchronization signals included in the 480p signal.

Generating the cost signal comprises generating n coast signals with n different pulse widths on the basis of the counted results.

N coast signals include a first coast signal with a pulse width that covers the number of falling edges and is less than 525, a second coast signal with a pulse width that covers the number of falling edges that ranges from 526 to 535, a third coast signal with a pulse width that covers the number of falling edges that ranges from 536 to 545, and a fourth coast signal with a pulse width that covers the number of falling edges that ranges from 546 to 558.

BRIEF DESCRIPTION OF THE DRAWINGS

The above and/or other aspects and/or advantages of the present invention will become more apparent by describing in detail exemplary embodiments thereof with reference to the attached drawings in which:

FIGS. 5A through 5D illustrate generated coast signals according to the present invention.

DETAILED DESCRIPTION OF THE PREFERRED EMBODIMENTS

The present invention will now be described more fully with reference to the accompanying drawings, in which embodiments of the present invention are illustrated.

Figure 2:
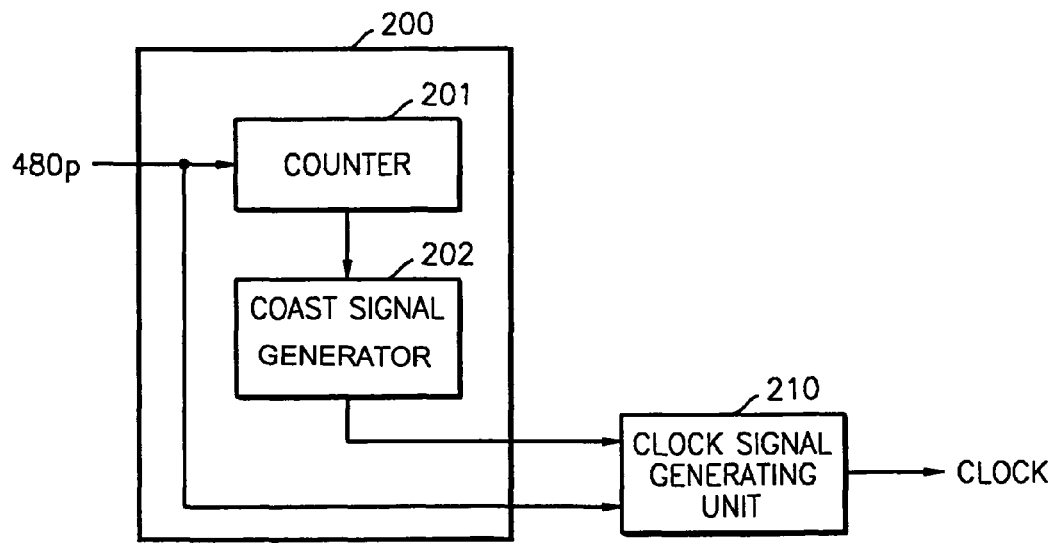
FIG. 2 illustrates an apparatus for generating a video-reproducing clock signal from a 480p signal, according to one embodiment of the present invention.

FIG. 2 illustrates an apparatus for generating a video-reproducing clock signal from a 480p signal, according to one embodiment of the present invention.

Figure 1:
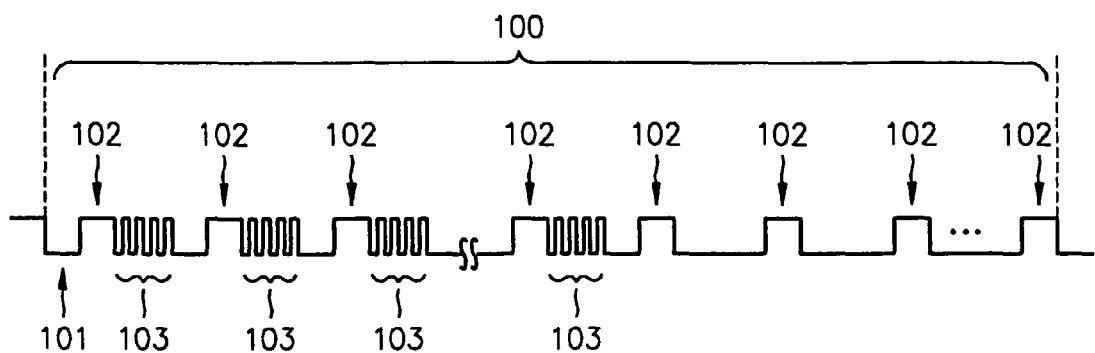
FIG. 1 illustrates a general 480p-format composite video signal.

The 480p signal is a standard-format signal used for digital TVs. Therefore, details of the same will not be provided herein. One frame of a 480p signal includes a vertical synchronization signal, horizontal synchronization signals, and copy guard signals, as shown in FIG. 1.

The apparatus of FIG. 2 includes a coast signal generating unit 200 and a clock signal generating unit 210.

The coast signal generating unit 200 generates a coast signal with a pulse width, which varies with the number of copy guard signals included in one frame signal of the 480p signal. The coast signal generating unit 200 includes a counter 201 and a coast signal generator 202. The counter 201 detects and counts the falling edges of square signals included in one frame signal of the 480p signal, just after the vertical synchronization signal is generated. The coast signal generator 202 generates N number of coast signals with different pulse widths each of which depends on the count values of the counter 201. For example, assuming 525 is the reference number of the falling edges of square signals that are included in one frame signal of the 480p signal, then a plurality of reference coast signals are determined, each of which has a different pulse width on the basis of the reference number of falling edges 525. For example, a first coast signal, a second coast signal, a third coast signal, and a fourth coast signal may be generated as reference coast signals. The first coast signal has a pulse width that covers the number of falling edges, and is less than 525. The second coast signal has a pulse width that covers the number of falling edges, and ranges from 526 to 535. The third coast signal has a pulse width covering the number of falling edges, and ranges from 536 to 545. The fourth coast signal has a pulse width that covers the number of falling edges, and ranges from 546 to 558.

While the coast signal is being generated, the clock signal generating unit 210 generates artificial horizontal synchronization signals with the same period as the previous horizontal synchronization signals and generates a phased-locked clock signal using the artificially generated horizontal synchronization signals.

Figure 3:
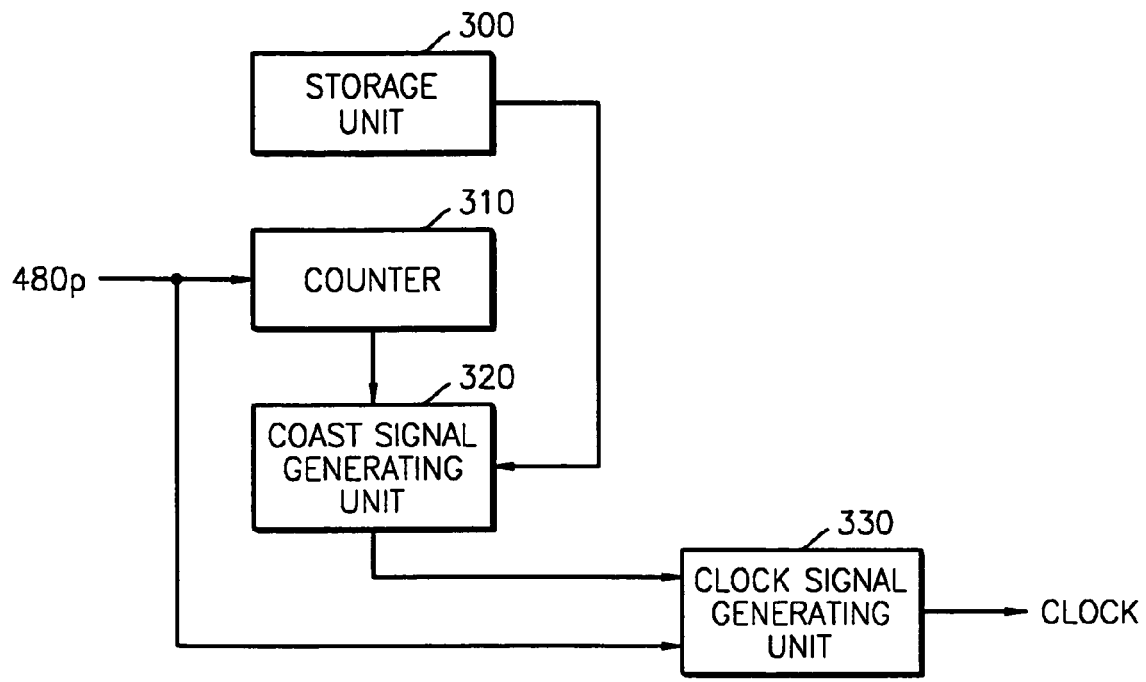
FIG. 3 illustrates an apparatus for generating a video-reproducing clock signal from a 480p signal, according to another embodiment of the present invention.

FIG. 3 illustrates an apparatus for generating a video-reproducing clock signal from a 480p signal, according to another embodiment of the present invention.

The apparatus of FIG. 3 includes a storage unit 300, a counter 310, a coast signal generating unit 320, and a clock pulse generating unit 330.

The storage unit 300 stores the information of the period of the horizontal synchronization signals generated in a previous frame.

The counter 310 counts the falling edges of signals generated after receipt of the vertical synchronization signal of a newly starting frame.

The coast signal generating unit 320 generates n coast signals that have n different pulse widths, each of which is based on n boundaries classified on the basis of the count value from the counter 310. For example, assuming 525 is the reference number of the falling edges of square signals that are included in one frame signal, then a reference coast signal is determined, a pulse width that corresponds to the reference number 525 or less than 525. And then the second coast signal is determined having a pulse width that covers the number of falling edges that ranges from 526 to 535, and the third coast signal having a pulse width that covers the number of falling edges that ranges from 536 to 545, and the fourth coast signal having a pulse width that covers the number of falling edges that ranges from 546 to 558. A clock signal generating unit 330 is equivalent to the clock signal generating unit 210 and will not be described in detail.

Figure 4:
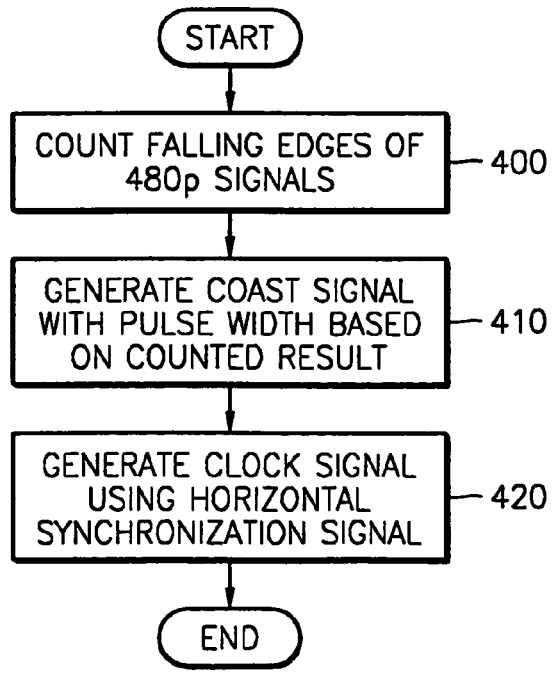
FIG. 4 is a flowchart describing a method for generating a video-reproducing clock signal from a 480p signal, according to the present invention.

FIG. 4 is a flowchart describing a method of generating a video-reproducing clock signal from a 480p signal, according to the present invention.

In the first operation 400, the falling edges of signals after a vertical synchronization signal included in the 480p signal are counted Then, in operation 410, a plurality of coast signals are generated on the basis of the counted number of falling edges. N boundaries are classified on the basis of the counted number, and coast signals with n different pulse widths are generated based on the n boundaries.

In operation 420, while the coast signal is being generated, horizontal synchronization signals are generated with the same period as that of the horizontal synchronization in the previous frame and then the clock signal is generated using the horizontal synchronization signals, without detecting the present horizontal synchronization signals generated from the 480p signal. While the coast signal is off, signals are generated using generated horizontal synchronization signals included in the 480p signal. Coast signals with n different pulse widths may be a first coast signal, a second coast signal, a third coast signal, or a fourth coast signal. The first coast signal has a pulse width that covers the number of falling edges, and is less than 525. The second coast signal has a pulse width that covers the number of falling edges, and ranges from 526 to 535. The third coast signal has a pulse width that covers the number of falling edges, and ranges from 536 to 545. The fourth coast signal has a pulse width that covers the number of falling edges, and ranges from 546 to 558.

FIGS. 5A through 5D illustrate generated coast signals according to the present invention.

FIG. 5A illustrates a coast signal with a pulse width that covers the number of falling edges, and is less than 525.

FIG. 5B illustrates a coast signal with a pulse width that covers the number of falling edges, and ranges from 526 to 535.

FIG. 5C illustrates a coast signal with a pulse width that covers the number of falling edges, and ranges from 536 to 545.

FIG. 5D illustrates a coast signal with a pulse width that covers the number of falling edges, and ranges from 546 to 558.

If a change occurs in the format of the copy guard signal included in the 480p signal, one of the plurality of coast signals is applied in accordance with the change of the format of the copy guard. Therefore, it is possible to prevent the generation of distorted clock signals and screen distortion.

The hardware included in the system may include memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. An apparatus that generates a video-reproducing clock signal from a 480p signal that includes a vertical synchronization signal, horizontal synchronization signals, and copy guard signals, the apparatus comprising:
    a coast signal generating unit, which generates a plurality of coast signals with pulse widths, each of which covers the different number of copy guard signals on the basis of the present copy guard signal in one frame signal of the 480p signal; and
    a clock signal generating unit, which generates horizontal synchronization signals at the same period as that of the horizontal synchronization signals generated in a previous frame, while the corresponding coast signal is being generated.

2. The apparatus of claim 1, wherein the coast signal generating unit comprises:
    a counter that counts falling edges of signals in the present frame signal of the 480p signal; and
    a coast signal generator that generates n coast signals with n different pulse widths on the basis of the counted falling edges of signals.

3. The apparatus of claim 2, wherein the coast signal generator generates a first coast signal with a pulse width that covers the number of falling edges and is less than 525, a second coast signal with a pulse width that covers the number of falling edges that ranges from 526 to 535, a third coast signal with a pulse width that covers the number of falling edges that ranges from 536 to 545, and a fourth coast signal with a pulse width that covers the number of falling edges that ranges from 546 to 558.

4. The apparatus of claim 1, wherein the clock signal generating unit generates a phase-locked clock signal using the horizontal synchronization signals, included in the 480p signal, while the coast signal is not being generated.

5. An apparatus that generates a video-reproducing clock signal from a 480p signal that includes a vertical synchronization signal, horizontal synchronization signals, and copy guard signals, the apparatus comprising:
    a storage unit that stores information of the period of the horizontal synchronization signals generated in a previous frame;
    a counter, that counts falling edges of signals generated after the vertical synchronization signal included in the 480p signal;
    a coast signal generating unit that generates n coast signals with n different pulse widths on the basis of the count values of the counter; and
    a clock signal generating unit that generates the horizontal synchronization signals with the period according to the information stored in the storing unit and generates a clock signal using the generated horizontal synchronization signals, while the coast signal is being generated, and that generates the clock signal using horizontal synchronization signals included in the 480p signal while the coast signal is not being generated.

6. The apparatus of claim 5, wherein the coast signal generating unit generates a signal with a reference pulse width that corresponds to a reference count value and generates signals with pulse widths, each of which is extended by a predetermined value.

7. The apparatus of claim 6, wherein the coast signal generating unit generates a first coast signal with a pulse width that covers the number of falling edges and is less than 525, a second coast signal with a pulse width that covers the number of falling edges that ranges from 526 to 535, a third coast signal with a pulse width that covers the number of falling edges that ranges from 536 to 545, and a fourth coast signal with a pulse width that covers the number of falling edges that ranges from 546 to 558.

8. A method of generating a video-reproducing clock signal from a 480p signal that includes a vertical synchronization signal, horizontal synchronization signals, and copy guard signals, the method comprising:

counting, using a counter device, falling edges of signals generated after the vertical synchronization signal included in the 480p signal;

generating a plurality of coast signals on the basis of the counted number of falling edges of a counter; and while a corresponding coast signal is being generated, generating the horizontal synchronization signals with a predetermined period, stored in a storage device, and generating a clock signal using the generated horizontal synchronization signals, and, while the coast signal is not being generated, generating the clock signal using the present horizontal synchronization signals included in the 480p signal.

9. A method of generating a video-reproducing clock signal from a 480p signal that includes a vertical synchronization signal, horizontal synchronization signals, and copy guard signals, the method comprising:

counting, using a counter device, falling edges of signals generated after the vertical synchronization signal included in the 480p signal;

generating a plurality of coast signals on the basis of the counted number of falling edges of a counter; and while a corresponding coast signal is being generated, generating the horizontal synchronization signals with a predetermined period, stored in a storage device, and generating a clock signal using the generated horizontal synchronization signals, and, while the coast signal is not being generated, generating the clock signal using the present horizontal synchronization signals included in the 480p signal, wherein generating the coast signal comprises generating n coast signals with n different pulse widths on the basis of the counted results.

10. The method of claim 9, wherein n coast signals include a first coast signal with a pulse width that covers the number of falling edges and is less than 525, a second coast signal with a pulse width that covers the number of falling edges that ranges from 526 to 535, a third coast signal with a pulse width that covers the number of falling edges that ranges from 536 to 545, and a fourth coast signal with a pulse width that covers the number of falling edges that ranges from 546 to 558.

* * * * *